July 11, 1967     R. T. CARRICO ETAL     3,330,169

DIFFERENTIAL LOCK-UP MECHANISM

Filed June 28, 1965

INVENTORS.
RALPH T. CARRICO and
KEITH E. PERCIFIELD
BY
Herbert A. Minturn
Attorney July 11, 1967 R. T. CARRICO ET AL 3,330,169
DIFFERENTIAL LOCK-UP MECHANISM
Filed June 28, 1965 2 Sheets-Sheet 2

INVENTORS.
RALPH T. CARRICO and
KEITH E. PERCIFIELD
BY Herbert A. Minturn
Attorney 3,330,169
DIFFERENTIAL LOCK-UP MECHANISM
Ralph Thomas Carrico and Keith E. Percifield, Indianapolis, Ind., assignors to Indus Corporation, Indianapolis, Ind., a corporation of Indiana
Filed June 28, 1965, Ser. No. 467,471
4 Claims. (Cl. 74—711)

ABSTRACT OF THE DISCLOSURE

A differential lock-up apparatus having members rolling over cams around hubs of side gears and within retaining rings each rotatable freely within the differential housing; the rings having end cams each pressing a member in a direction at a right angle to the direction of rotation of the ring toward an internal planar differential face upon the interengagement of the rolling members with said ring.

---

This invention relates to an improvement in structures overcoming the spinning of one wheel of a vehicle normally driven in unison with another wheel drivingly intercoupled through a differential structure, such spinning being set up by a difference in traction encountered by the two wheels. The improvement deals with a simple mechanism applied to the differential without any material alteration thereof to give power application to both wheels even though traction may vary considerably therebetween.

It is a primary object of the invention to "lock-up" a drive shaft with the differential housing, on which shaft, the wheel tending to spin is secured through an exceedingly yet most effective compact structure, which "lock-up" is promptly and automatically released upon both wheels having approximately the same traction.

A further primary object of the invention is to incorporate it in a light weight mechanism confined entirely within the differential housing, and yet having a long life, being low in cost, and free of maintenance over years of service.

We are well aware of the fact that others have attempted to solve the problem met by our invention. Such attempts have employed one way clutches for different proportions of speeds of a driven member; resilient rubber cushions; brake drums; reaction sleeves; opposing springs between driving and driven elements; and clock-like pawls operating somewhat in a clock escapement motion, but our inventive structure provides a superior action in a quite compact form.

In addition to the objects above indicated, additional objects and advantages will become apparent to those versed in the art in the following description of structure embodying the invention as illustrated in the accompanying drawings, in which FIG. 1 is a central, longitudinal section through a differential with two wheel drive shafts coupled thereby, and to which the invention is applied;

Figure 3:
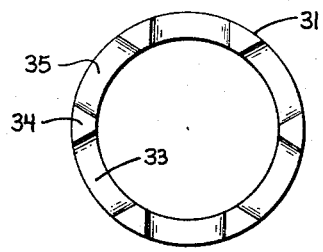
FIG. 3 is a ball cage and cam member in end elevation.

Referring first to that form of the invention illustrated in FIGS. 1–5, a differential generally designated by the numeral 10 has a sprocket 11 fixed to the housing 12 as a means of driving the housing 12 and the two wheel shafts 13 and 14. The shafts rotatably, coaxially enter the housing 12 from its opposite ends 15 and 16, each respectively carrying a side gear 17 and 18 on splined end portions 19 and 20 of the shafts, the gears being retained by snap rings 21.

A spider 22 bears on shaft end portions 23 of the shafts 13 and 14. A pin 24 extends in fixed manner centrally through the spider 22 to have the pin longitudinal axis at a right angle to the axis of the shafts 13 and 14. Pinion gears 25 and 26 are rotatably carried respectively on outer end portions of the pin 24 in constant mesh with both side gears 17 and 18.

The side gears 17 and 18 each have a hub 27 and 28 respectively extending around and along the splined shaft portions 19 and 20. The side gears each have a larger peripheral diameter than the diameter of the hubs, forming radially extending shoulders 29 and 30. The differential housing 12 has longitudinal cylindrical chambers 12a within which the hubs 27 and 28 extend, spaced radially from the walls of the chamber.

Circular cam plates 31 and 32 (FIGS. 1, 2 and 3) surround and are fixed to the respective hubs to bear against the shoulders 29 and 30. The outside diameters of the plates 31 and 32 are less than internal diameters of the chambers 12a. Each plate 31 and 32 has a plurality of circumferential slots 33 extending between intervening posts 34. Each slot 33 has an inclined floor 35 between posts 34. In the form (FIG. 3) herein shown there are six posts 34 spaced equidistant around the plates 31 and 32. The angle of floor inclination is the same for each slot. The plates 31 and 32 are identical one to the other in formation and size, except that the plates are rights and lefts in respect to the direction of the floor inclination. The posts 34 terminate in a common plane at a right angle to the axis of the respective shafts 13 and 14 and parallel to the shoulders 29 and 30. The angle of the floor inclination of the slots 33 is such that it normally slopes from one end in a direction outwardly from the side gears, FIG. 2.

Figure 2:
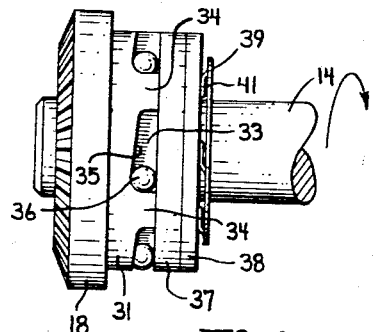
FIG. 2 is a detail in side elevation of a side gear and a lock-up mechanism.

There is a ball 36 carried in each slot 33. Normally the ball 36 in each instance will be carried in its slot 33 at the end thereof which is the deepest (FIG. 2). This slot deepest end has a depth from the outer plane of the posts 34 which will receive a ball 36 and normally retain it that deepest end without pressure against a collar 37 which is an annular ring of constant thickness longitudinally of the hub 28, around which, the collar 37 is free to turn and also shift longitudinally of the hub 28. The external diameter of the collar 37 is less than chamber 12a diameters.

Pressure rings 38, one each, freely surround the shafts 13 and 14 and are free to shift longitudinally of the shafts within the chambers 12a. An annular spring member 39 respectively surrounds each of the shafts 13 and 14 and is carried in a counterbore 40. This member 39 has a plurality of tongues 41, herein shown (FIG. 4) as six in number and extending toward the pressure ring 38 in each instance. These tongues 41 each also extend in a common circumferential direction a distance around the member 39. The rings 38, each upon pressure being exerted longitudinally have their tongues 41 pressed into the counterbore to allow the ring 38 to come against the face 42 of the housing 12 extending radially from the counterbore 40 upon compression of the spring tongues 41.

Operation

Assuming that the sprocket 11 is turning the differential 10 and the shaft 13 is driving a wheel (not shown); this wheel has traction; and that the shaft 14 has a wheel thereon (not shown) which wheel encounters a slick spot such as ice, snow and mud or as on sand or loose gravel, without traction accordingly, the shaft 13 will become stationary; the shaft 14 will tend to reverse its direction of rotation. This is the normal action of a differential described herein.

Figure 1:
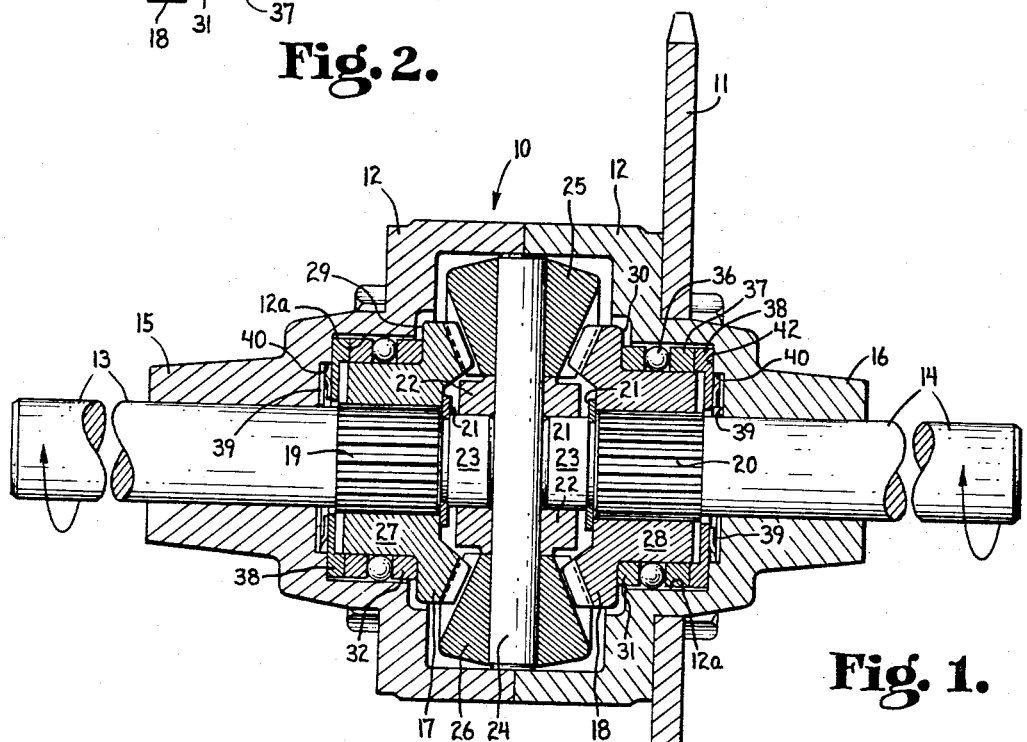
Figures 4, 5:
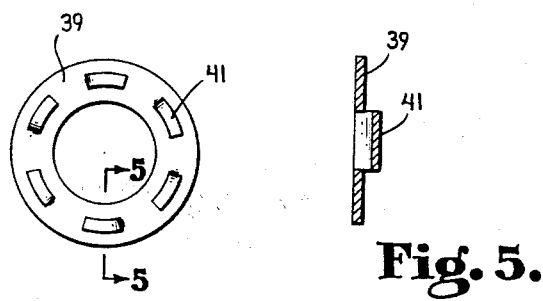
FIG. 4 is a view in end elevation of a spring cushioning member.
FIG. 5 is a view on an enlarged scale in section on the line 5—5 in FIG. 4.

In FIGS. 1 and 2, the normal directions of travel of the shafts 13 and 14 are indicated by arrows. In this normal travel, the balls 36 will remain in the deepest ends of the slots 33. However, when the differential is continued to be turned, in the assumption above set forth, the reverse turning of the shaft 14 will cause the balls 36 to ride up over the cam floors 35 from their normal stationary positions above indicated.

This travel of the balls 36, is resisted by the covering collar 37. This collar 37 is pushed longitudinally of the shaft 14, in turn pushing the pressure ring 38 initially against the spring tongues 41, and finally pushing the ring 38 into frictional rotating contact with the differential housing face 42, thereby arresting rotation of the shaft independently of the rotation of the differential 10. Upon this result being set up, the shaft 14 then must turn with the driven differential, and the side gear 28 is "locked" against rotation independently of the differential. Thus, both shafts 13 and 14 will be driven in a common direction by turning of the differential.

Upon the wheel of the shaft 14 again experiencing traction, the "lock-up" is released by reason of that shaft 14 wheel then setting up resistance and allowing the cam member 31 to turn in relation to the collar 37 and allow the balls 36 to roll down the cam floors 35 to the deepest ends.

Modified form

Figure 8:
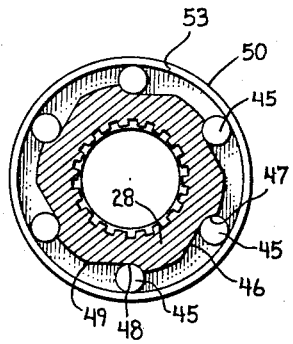
FIG. 8 is a view in end elevation of a roller cage and cam member.
Figure 6:
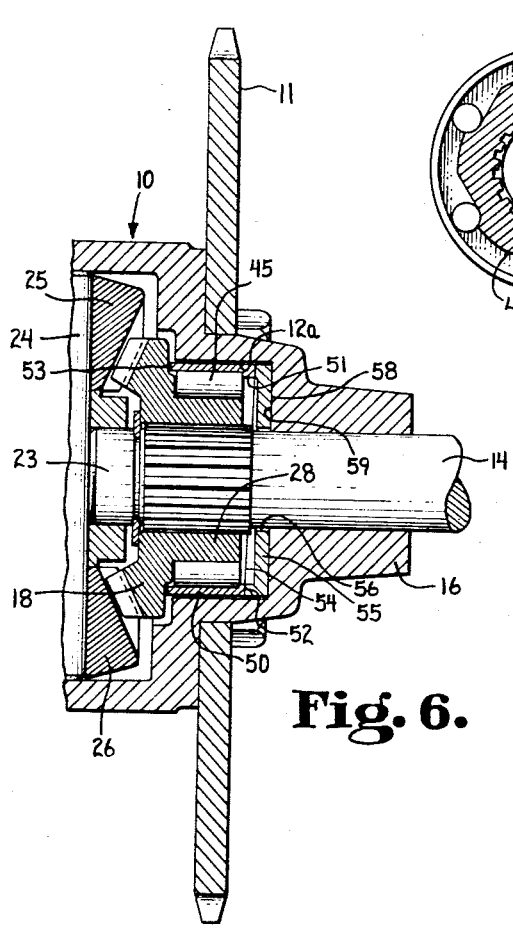
FIG. 6 is a view in section through approximately half of a differential of the structure shown in FIG. 1, but having a modified form of "lock-up" structure employing rollers applied thereto.
Figure 7:
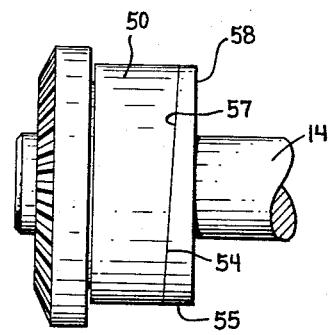
FIG. 7 is a view in side elevation of a side gear and the form of "lock-up" structure shown in FIG. 6.

A slightly modified form of the invention is illustrated in FIGS. 6–8. In this form, rollers 45 are substituted for the balls 36. These rollers 45 normally ride on cam floors 46 against stops 47. While the number of rollers may be varied six rollers 45 are herein shown. These cam floors 46 and stops 47 are, in the present illustration, formed in the side gear hub 28. The cam floors 46 slope radially from an innermost low end 48 adjacent the stops 47 to an outermost high end 49 in each instance.

A cylindrical barrel 50 in the nature of a ring surrounds the rollers 45 in close proximity thereto, but with a running clearance. The exterior of the barrel is cylindrical and has a clearance between it and the interior of the housing cavity 12a. There is a roller retainer rib 51 around the peripheral edge portion 52 farthest removed from the side gear 18. The end 53 of the barrel 50 abuts the side gear 18. The rollers 45 are held against appreciable longitudinal travel by approaching by respective ends of the side gear 18 and the rib 51. The end of the barrel 50 which carries the rib 51 has an annular face 54 in a plane disposed at an acute angle to the axis of the shafts serving as a cam.

A cam ring 55 has a central hole 56 through which the shaft 14 freely extends and also a cam face 57, FIG. 7 in a parallelism with the cam face 54. The ring 55 also has a face 58 which may frictionally bear against the housing face 59, which face 58 is perpendicular to the axis of the shaft 14. Thus, here again are elements 45 rollable on inclined cam faces 46 when the shaft 14 starts turning in the reverse direction to the normal driving direction. In so doing, the rollers 45 will wedge between the cam surfaces 46 and the inside of the barrel 50. This wedging action causes the barrel 50 to turn, and, in so doing, the end cam face 54 on the barrel 50 will slide circumferentially around the cam face 57 on the ring 55 and urge the ring 55 against the housing face 59 and arrest farther travel of the shaft 14 and the side gear 18.

It is to be noted that in both forms described, the action is the same in that rolling elements wedge between the element carrier by travelling up a cam face progressively rising to wedge the rolling elements setting up a movement urging a pressure element into frictional engagement with the differential housing thereby overcoming rotation of a drive shaft. While the roller form of structure has been described as applying to the shaft 14, the same structure employing a reversely sloping cam face 46, is employed to overcome reverse travelling of the shaft 13.

While we have herein shown and described our invention in two forms now best known to us, it is obvious that structural changes may be employed without departing from the spirit of the invention and we therefore do not intend to be limited to those forms beyond the limitations as may be imposed by the following claims.

We claim:

1. The combination with a differential structure having a housing within which are rotatably carried two opposing sides gears with intervening intermeshed pinion gears and a separate drive shaft drivingly connected to each of said side gears, of a
    cylindrical hub carried by each of said side gears;
    said housing having opposing facial surfaces through which said shafts respectively extends;
    cam floors circumferentially spaced apart around each of said hubs between said side gears and said faces;
    a rolling member for each of said cam floors;
    a rolling member ring retaining said rolling members over said cam floors;
    each of said floors sloping from one end spaced a distance from said retaining ring slightly greater than the diameter of the rolling members to the other end having a distance from the retaining ring less than the diameter of the rolling members; and
    a pressure ring around each of said shafts between said retaining ring and said housing face in each instance;
    rotation of one shaft in a reverse direction of rotation of the other shaft carrying the cam floors around the hub of the side gear fixed to said one shaft thereby wedging the rolling members between their respective floors and the rolling members retaining ring setting up a travel of the pressure ring longitudinally of the one shaft to come into pressure contact with the housing face surrounding said one shaft causing turning of the one shaft in unison with the differential structure.

2. The structure of claim 1, in which
    there is a counterbore in said housing face; and
    spring means within said bore having elastic portions normally extending from said bore beyond said face yieldingly resisting travel of the pressure ring toward said face.

3. The structure of claim 1, in which
    said floors having widths extending longitudinally of said hubs;
    said floors each having a depth radially less at said one end than at the other end, varying from the one end of a depth receiving a rolling member resting on the floor with at least running clearance between it and said retaining ring to the other said end;
    said retaining ring being generally cylindrical in shape circumferentially encompassing the rolling members therewithin;
    a member carried by and at the end of the retaining ring directed toward said face and spaced therefrom;
    said last member having a cam face;
    said pressure member having a cam surface engaged by said retainer ring cam face; and
    said cam faces being such, that, upon reverse travel of said shaft and side gear, said rolling members will be carried along said floors toward the said floor other end to wedge between said floors and said retaining ring to drive the retaining ring circumferentially with said gear hub in turn turning said retainer cam face over said pressure ring cam face to stop said reverse turning of the hub engaged shaft and thereby cause the differential structure to drive the shaft in its opposite, normal direction.

4. The structure of claim 3, in which
said rolling members are rollers;
said cylindrical retainer ring has radially inturned end in the nature of a rib extending over ends in part at least of said rollers; and
said retainer ring has its said cam face extending over said rib end.

References Cited
UNITED STATES PATENTS

| | | | |
|---|---|---|---|
| 1,075,142 | 10/1913 | Deming | 74—710 |
| 1,282,614 | 10/1918 | Miller | 74—711 |
| 1,777,024 | 9/1930 | Wildhaber | 74—711 |
| 2,050,344 | 8/1936 | Lapham | 74—711 |

FRED C. MATTERN, Jr, *Primary Examiner.*

DAVID J. WILLIAMOWSKY, *Examiner.*

J. A. WONG, *Assistant Examiner.*